No. 880,236.

PATENTED FEB. 25, 1908.

J. NUTTALL.
APPARATUS FOR CUTTING RAGS, ROPES, AND THE LIKE.
APPLICATION FILED JUNE 18, 1907.

3 SHEETS—SHEET 1.

WITNESSES

INVENTOR
James Nuttall
BY
Howson and Howson
ATTORNEYS

No. 880,236. PATENTED FEB. 25, 1908.
J. NUTTALL.
APPARATUS FOR CUTTING RAGS, ROPES, AND THE LIKE.
APPLICATION FILED JUNE 18, 1907.

3 SHEETS—SHEET 3.

WITNESSES

INVENTOR
James Nuttall
BY
Howson and Howson
ATTORNEYS

UNITED STATES PATENT OFFICE.

JAMES NUTTALL, OF BURY, ENGLAND.

APPARATUS FOR CUTTING RAGS, ROPES, AND THE LIKE.

No. 880,236.  Specification of Letters Patent.  Patented Feb. 25, 1908.

Application filed June 18, 1907. Serial No. 379,558.

*To all whom it may concern:*

Be it known that I, JAMES NUTTALL, a subject of the King of Great Britain and Ireland, of 171 Walmersley road, Bury, in the county of Lancaster, England, engineer, have invented certain new and useful Improvements in Apparatus for Cutting Rags, Ropes, and the Like, of which the following is a specification.

My invention relates to apparatus for cutting rags, ropes, and the like, in which apparatus the material is first cut in one direction by guillotine, or rotary, cutters, and then is fed to, and cut in the other direction between, a fixed, or dead, knife and spiral knives on a rotary carrier, and the object of my invention is to simplify such apparatus and make it so that it acts very efficiently, and I provide means whereby the aforesaid fixed, or dead, knife can be used for a longer period than hitherto.

I will describe my invention with reference to the accompanying drawings.

Figure 1:
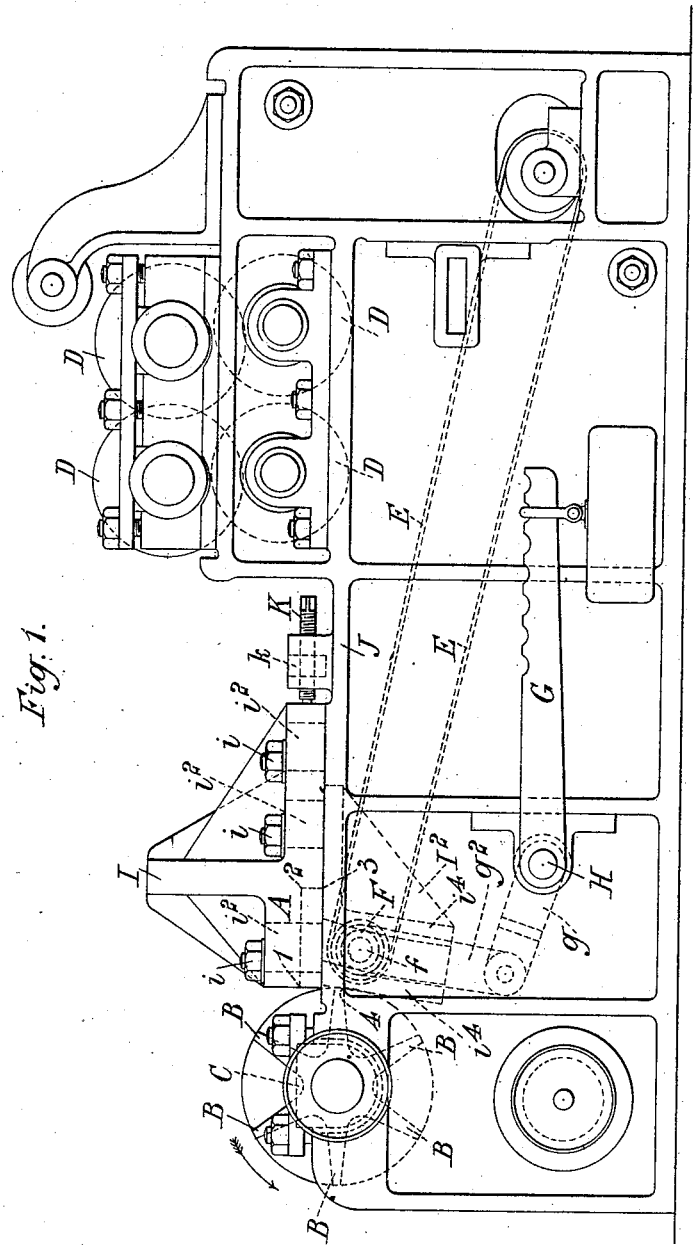
Figure 2:
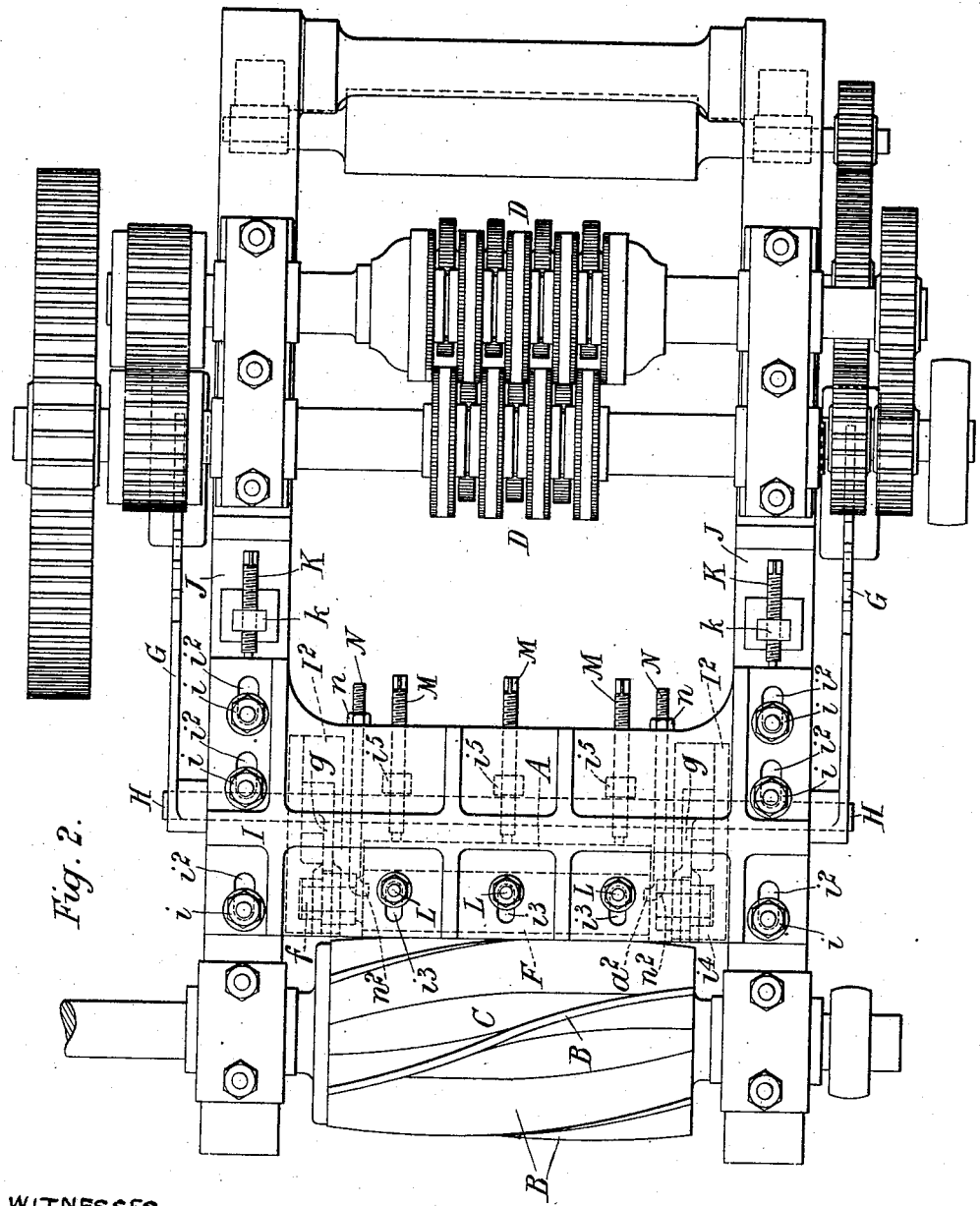
Figure 3:
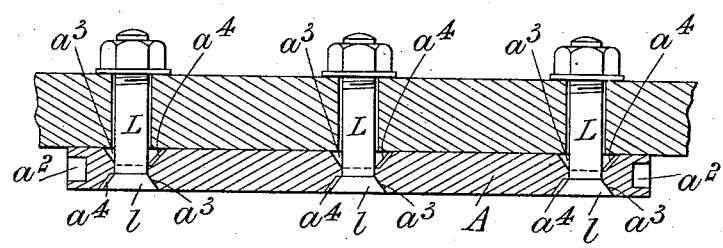
Figure 4:
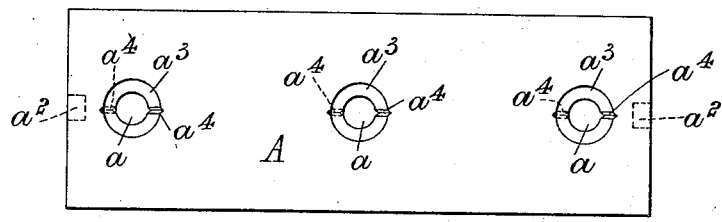

Figure 1 is a side elevation and Fig. 2 a plan of mechanism in accordance with my invention. Fig. 3 is a longitudinal section and Fig. 4 a plan of a fixed, or dead, knife as hereinafter described.

I arrange a fixed, or dead, knife A and a rotatory knife consisting of spiral blades B on a rotary carrier C, between which knives the material is cut after it has been cut by the first cutters D, which are shown as being serrated disk-cutters, although they may be guillotine knives, or cutters, of other suitable kind. The fixed, or dead, knife A is in a position slightly above the center on which the rotary knife turns, and parallel with the said rotary knife, and I rotate the rotary knife carrier C so that the blades B carried by it pass the fixed, or dead, knife A in an upward direction so that the material is cut upwards and thrown over the top of the rotary knife blades B. The material is conducted from the first cutters D to the said fixed, or dead, knife and rotary knives by an apron, or creeper, E, one of the rollers (F) over which the said apron, or creeper, passes being beneath the fixed, or dead, knife A and being held up to its working position, which may be done by means of springs, or, as shown, by means of weighted levers G keyed to a shaft H to which are fixed arms $g$ connected to links $g^2$ carrying the axle $f$ of the roller F, which axle is guided at each end in guides $i^4$ in projections $I^2$ from the underside of the carrier I. The roller F and the part of the apron or creeper, E which passes over it act as a feeder as well as a carrier for the material being operated upon and the aforesaid springs, or arrangement of weighted levers, arms and links allow the roller F and the part of the apron, or creeper, E passing over it to rise and descend according to the amount of material passing between the apron, or creeper, E and the underside of the fixed, or dead, knife, A. By this means the material is fed directly to the fixed, or dead, and rotary, knives, without having to bend the said material, which is an especial advantage when stiff material is being operated on.

The fixed, or dead, knife A and its means of attachment I arrange so that the said knife A can be readjusted and fixed in position for either of its four longitudinal edges (1, 2, 3, 4, Fig. 1) to be brought into position to act as a cutter, the grinding of the two edges on either of the sides of the knife being effected at one operation.

The fixed, or dead, knife A is carried by a holder I fixable to the main frame J by screw bolts and nuts $i$ passing through slotted holes $i^2$ and when the nuts of these screw bolts are slackened, the said holder I is adjustable relatively to the rotary blades B, by means of screws K passing through screw-nuts $k$ on the main frame J, the roller F being at the same time adjusted as the guides $i^4$ of its axle $f$ are rigid with the holder I. The said fixed, or dead, knife A is secured to the said holder I by means of screw bolts L passing through holes $a$ in the fixed, or dead, knife, the said holes $a$ being so arranged symmetrically with the sides and ends of the said knife A that whether the said knife A be turned end for end, or be reversed, so that what was the upper side is brought undermost, the holes $a$ therein will still coincide with the slotted holes $i^3$ in the holder I for the securing screw bolts L. Adjusting screws M passing through nuts $i^4$ on the holder I bear on the rear of the fixed, or dead, knife A to adjust it in the holder I relatively to the rotary blades B and the roller F, and the said knife A can be held in its adjusted position by rods N passing through the holder I and provided at one end with the locking nuts $n$ and at the other end with turned-in, or hooked, ends $n^2$ engaging with central holes $a^2$ in the ends of the fixed, or dead, knife A. The screw bolts L by which the fixed, or dead, knife A is secured to the holder I are provided with heads $l$ which engage in countersinks $a^3$ around the holes $a$ in the fixed, or dead, knife A, so that the side of the said knife A which is undermost has no projections from it. The said heads $l$ and the countersinks $a^3$ with which they engage are preferably cone-shaped, as shown. The countersinks $a^3$ are made on each side of the knife A so as to allow of the engagement of the heads $l$ of the screw bolts L whichever side of the said knife A is undermost. A groove and feather arrangement $a^4$ may be used to prevent the bolts L turning in the openings $a$ in the fixed, or dead, knife A, or, for this purpose, the heads $l$ of the said screw bolts L and the recesses therefor in the fixed, or dead, knife A may be made non-circular.

Having now particularly described and ascertained the nature of my said invention and in what manner the same is to be performed, I declare that what I claim is:—

1. In an apparatus for cutting rags, ropes and the like, cutters to cut the material in one direction, and cutters to cut the material in another direction, said second set of cutters comprising a fixed knife and a knife rotated past said fixed knife in an upward direction, said fixed knife being arranged in a plane only slightly above the axial plane of the rotary knife, substantially as described.

2. In apparatus for cutting rags, ropes, and the like, the combination with a fixed knife and a knife rotated past the fixed knife in an upward direction, of a creeper passing over a counterweighted roller beneath the fixed knife, so as to act both as a carrier and feeder of the material to the said knives.

3. In apparatus for cutting rags, ropes and the like, the combination with a fixed knife and a knife rotated past the fixed knife in an upward direction, of a creeper yieldingly supported beneath the fixed knife so as to act both as a carrier and yieldable feeder to the said knives.

4. In apparatus for cutting rags, ropes and the like, cutters to cut the material in one direction, cutters to cut the material at an angle to said first cut and means yieldingly supported to convey and feed the material from the first to the second set of cutters.

5. In apparatus for cutting rags, ropes, and the like, the combination with a rotary knife and a fixed knife secured in place by means symmetrically arranged for reversal of its faces and ends, of adjusting screws and screw rods and nuts, the said rods having hooked ends engaging with central holes in the ends of the fixed knife; substantially as hereinbefore described.

In testimony whereof I have signed my name to this specification in the presence of two subscribing witnesses.

JAMES NUTTALL.

Witnesses:
   ERNALD SIMPSON MOSELEY,
   MALCOLM SMETHURST.